UNITED STATES PATENT OFFICE 2,030,210

ISOLATION AND PURIFICATION OF THE GONAD STIMULATING HORMONE

Frederick L. Hisaw and Harry L. Fevold, Madison, Wis., assignors to Wisconsin Alumni Research Foundation, Madison, Wis., a corporation of Wisconsin No Drawing. Application November 16, 1931, Serial No. 575,481. Renewed September 15, 1934

1 Claim. (Cl. 167—74)

This invention relates particularly to the method of extracting, isolating and purifying from the anterior lobe of the hypophysis or pituitary gland or other sources, a hormone responsible for gonad stimulation and to the product obtained by such method of treatment.

Our object is to isolate and purify, and to provide a method for the isolation and purification of the gonad stimulating hormone.

It has been known heretofore that there existed in the anterior lobe of the hypophysis of a mammal, in the placenta of a human being and in the urine and blood of pregnant animals, a substance or substances responsible for the growth of the Graafian follicles, ovulation, stimulation of endocrine activities of the testis, prolongation of the life of the corpus luteum and the promotion of conditions typical of pregnancy in the uterus and mammary glands coupled with the absence of oestrum. We have succeeded in extracting from the anterior lobe of the hypophysis or pituitary gland and from other sources two hormones which in combination give the results and have the effect above mentioned, but which, when isolated one from the other, have each their characteristic effects. One of these hormones we have called the gonad stimulator because of its effect upon the reproductive glands. This hormone and the method of its extraction and isolation is the subject matter of this application. The other of the two hormones because of its specific effect upon the corpora lutea, we have called the luteinizing hormone or luteinizer. The extraction of the hormones from the containing animal matter and the isolation from the extracted substance of the luteinizing hormone is the subject matter of an application of Ser. No. 575,480, filed November 16, 1931.

Pituitary glands as a source of the gonad stimulator may be obtained from slaughter houses from the bodies of sheep, cattle and swine. The blood and urine of pregnant animals and the placenta of the human being may likewise be used as sources from which to extract and isolate the gonad stimulator.

If the pituitary gland is used, it is first ground and dried. It is not necessary to separate the anterior lobe from the rest of the gland, because the remainder under our method of extraction and isolation does not affect the results in any way. However, only the anterior lobe is potent, and if desired it may be segregated. The dried pituitary gland is extracted for 24 hours with 50% aqueous pyridine as a solvent. The insoluble material is centrifuged off. The pyridine extract is then evaporated to dryness.

If this solute is emulsified in distilled water, and the emulsification injected into immature female rats, it has the properties of opening the vagina prematurely of causing growth of the Graafian follicles and by prolonging the life of the corpora lutea, it promotes pseudo-pregnancy as shown by the condition of the uterus and mammary glands and the absence of oestrum. Both the gonad stimulating hormone and the luteinizing hormone are therefore present.

By leaching the dried pyridine extract with freshly distilled water and completely freeing the distilled water solution from insoluble material by the use of a centrifuge, a water solution is obtained which still retains quantitatively its property of opening the vagina and causing follicular growth, but which does not have the properties of the whole emulsified pyridine extract. However, if united again to the water insoluble residue and injected as before, results are obtained entirely similar to the whole emulsified pyridine extract. The presence of two hormones and their separation is thus shown.

The distilled water solution responsible for follicular growth and opening the vagina may be freed from impurities by adding an excess of alcohol causing the precipitation of the follicular stimulating hormone which may be again dissolved in water for injection.

If desired there may be used instead of pyridine as a solvent to extract the hormones from the containing animal matter other weak bases of similar hydrogen ion concentration.

Besides causing or stimulating growth of the Graafian follicles and premature opening of the vagina of rats, the gonad stimulator promotes precocious sexual maturity in the female by causing the ovary to secret follicular hormones and by the production of ova. It also promotes ovulation. By administering it, more ova are released from the ovaries than normally. The results in the female are dependent upon the follicular stimulating effect of the hormone. Precocious sexual maturity is produced in young males by stimulating endocrine activities of the testis. For example, a female rat matures at about 70 days of age, and a male rat somewhat later, but by administering of the gonad stimulator female rats will mate when 25 or 30 days old and produce young.

The gonad stimulating harmone is soluble in aqueous solutions, but insoluble in ethyl ether, ethyl alcohol, petroleum ether, or 99% pyridine.

It is soluble in acidic or basic aqueous solutions, but in such solutions is inactivated rapidly. In 1% ammonia solution, it is fairly stable, but gradually loses its activity. It is injured by boiling in aqueous solutions and killed by prolonged boiling.

The gonad stimulator has a probable use in cases of sterility. Senile laboratory female animals, passed their reproductive period, have become pregnant after administration of the gonad stimulator. It is probable that it will work similarly in women and in senile but value breeding mares, cows and sows. Another probable use is in the treatment of infantalism due to the absence of this anterior lobe hormone. Still another probable use is in menopause troubles caused by the absence of the follicular hormone. The gonad stimulator will cause the Graafian follicles to produce their own follicular hormones.

What we regard as new and desire to secure by Letters Patent is:

The method of producing a gonad stimulator hormone from the pituitary gland of animals, which consists in comminuting and drying said gland matter, subjecting said dried matter to aqueous pyridine to extract the portions of said gland matter soluble in said aqueous pyridine, drying said extract, leaching the residue with water and precipitating by alcohol from said water solution, the substance which has the property of stimulating the growth and development of follicles in the ovary and enlargement of the testicles.

FREDERICK L. HISAW.
HARRY L. FEVOLD.